(12) United States Patent
Kerr et al.

(10) Patent No.: US 12,387,397 B2
(45) Date of Patent: Aug. 12, 2025

(54) AUTOMATICALLY GENERATING AXES FOR DATA VISUALIZATIONS INCLUDING DATA BOUND OBJECTS

(71) Applicant: Adobe Inc., San Jose, CA (US)

(72) Inventors: Bernard Kerr, Sausalito, CA (US); Dmytro Baranovskiy, Sydney (AU); Corey Lucier, Berryville, VA (US)

(73) Assignee: Adobe Inc., San Jose, CA (US)

( * ) Notice: Subject to any disclaimer, the term of this patent is extended or adjusted under 35 U.S.C. 154(b) by 27 days.

(21) Appl. No.: 17/980,485

(22) Filed: Nov. 3, 2022

(65) Prior Publication Data

US 2024/0153172 A1    May 9, 2024

(51) Int. Cl.
*G06T 11/20* (2006.01)
*G06T 3/40* (2024.01)

(52) U.S. Cl.
CPC ............ *G06T 11/206* (2013.01); *G06T 3/40* (2013.01); *G06T 2200/24* (2013.01)

(58) Field of Classification Search
CPC ...... G06T 11/206; G06T 3/40; G06T 2200/24
USPC .................................................. 345/440, 661
See application file for complete search history.

(56) References Cited

U.S. PATENT DOCUMENTS

| | | | |
|---|---|---|---|
| 5,226,118 A | 7/1993 | Baker et al. | |
| 5,359,724 A | 10/1994 | Earle | |
| 5,437,008 A | 7/1995 | Gay et al. | |
| 5,461,708 A | 10/1995 | Kahn | |
| 5,581,678 A | 12/1996 | Kahn | |
| 5,608,899 A | 3/1997 | Li et al. | |
| 5,619,631 A | 4/1997 | Schott | |
| 5,990,888 A | 11/1999 | Blades et al. | |
| 5,999,192 A | 12/1999 | Selfridge et al. | |
| 6,995,768 B2 | 2/2006 | Jou et al. | |
| 7,158,123 B2 | 1/2007 | Myers et al. | |
| 7,574,652 B2 | 8/2009 | Lennon et al. | |
| 7,644,361 B2 | 1/2010 | Wu et al. | |
| 7,788,606 B2 | 8/2010 | Patel et al. | |
| 8,527,909 B1 | 9/2013 | Mullany | |
| 8,581,840 B2 | 11/2013 | Mudu et al. | |
| 8,661,358 B2 | 2/2014 | Duncker et al. | |
| 8,743,122 B2 | 6/2014 | Riche et al. | |
| 8,860,762 B2 | 10/2014 | Koshi et al. | |
| 9,058,365 B2 | 6/2015 | Baumgaertel et al. | |
| 9,134,901 B2 | 9/2015 | Cragun | |

(Continued)

OTHER PUBLICATIONS

Non-Final Office Action, U.S. Appl. No. 17/980,481, filed Apr. 12, 2024, 33 pages.

(Continued)

*Primary Examiner* — Prabodh M Dharia
(74) *Attorney, Agent, or Firm* — Nicholson De Vos Webster & Elliott LLP

(57) ABSTRACT

Embodiments are disclosed for generating a data-bound axis for a data visualization. In some embodiments, a method of generating a data-bound axis for a data visualization includes receiving a data set and generating a chart including a plurality of graphic objects based on the data set and a visual property of the plurality of graphic objects. A scale associated with the chart is determined based on the data set and the plurality of graphic objects. At least one axis graphic object is generated based on the scale. The at least one axis graphic object is added to the plurality of graphic objects of the chart.

20 Claims, 12 Drawing Sheets

(56) References Cited

U.S. PATENT DOCUMENTS

| | | |
|---|---|---|
| 9,135,233 B2 | 9/2015 | Fan et al. |
| 9,158,766 B2 | 10/2015 | Blyumen |
| 9,202,297 B1 | 12/2015 | Winters et al. |
| 9,251,548 B1 | 2/2016 | Garrity et al. |
| 9,323,445 B2 | 4/2016 | Kritt et al. |
| 9,377,864 B2 | 6/2016 | Tullis et al. |
| 9,389,777 B2 | 7/2016 | Sekharan |
| 9,513,792 B2 | 12/2016 | Koshi et al. |
| 9,558,172 B2 | 1/2017 | Rampson et al. |
| 9,563,674 B2 | 2/2017 | Hou et al. |
| 9,569,082 B1 | 2/2017 | Jin et al. |
| 9,690,449 B2 | 6/2017 | Morozov et al. |
| 9,760,262 B2 | 9/2017 | Drucker et al. |
| 9,761,026 B1 | 9/2017 | Barabas et al. |
| 9,792,017 B1 | 10/2017 | Landefeld et al. |
| 9,804,726 B1 | 10/2017 | Joos et al. |
| 9,817,563 B1 | 11/2017 | Stokes et al. |
| 9,824,470 B2 | 11/2017 | Kuo |
| 9,892,531 B2 | 2/2018 | Csenteri et al. |
| 10,049,141 B2 | 8/2018 | Prophete et al. |
| 10,109,086 B1 | 10/2018 | Bakshi et al. |
| 10,146,846 B2 | 12/2018 | Genochio et al. |
| 10,275,305 B2 | 4/2019 | Venkateswarulu et al. |
| 10,282,360 B2 | 5/2019 | Krause et al. |
| 10,416,871 B2 | 9/2019 | Hou et al. |
| 10,423,313 B2* | 9/2019 | Olsson .................. G06F 3/0482 |
| 10,521,077 B1 | 12/2019 | Beran |
| 10,685,035 B2 | 6/2020 | Keahey et al. |
| 10,698,599 B2 | 6/2020 | D'Angelo et al. |
| 10,732,810 B1 | 8/2020 | Cohen et al. |
| 10,809,881 B2 | 10/2020 | Kindelsberger et al. |
| 10,877,984 B1* | 12/2020 | Martino ................ G06F 16/248 |
| 11,023,110 B2 | 6/2021 | Kerr |
| 11,042,558 B1 | 6/2021 | Hearst et al. |
| 11,270,483 B1 | 3/2022 | Chilamakuri et al. |
| 11,340,750 B1 | 5/2022 | Willis et al. |
| 11,625,149 B2 | 4/2023 | Leyden et al. |
| 12,056,445 B2 | 8/2024 | Dvorak |
| 2002/0059258 A1 | 5/2002 | Kirkpatrick |
| 2002/0118192 A1 | 8/2002 | Couckuyt et al. |
| 2004/0030504 A1* | 2/2004 | Helt ....................... G16B 30/00 702/20 |
| 2004/0085316 A1 | 5/2004 | Malik |
| 2005/0068320 A1 | 3/2005 | Jaeger |
| 2005/0108643 A1 | 5/2005 | Schybergson et al. |
| 2005/0232055 A1 | 10/2005 | Couckuyt et al. |
| 2007/0126736 A1 | 6/2007 | Tolle et al. |
| 2009/0096812 A1 | 4/2009 | Boixel et al. |
| 2009/0322755 A1 | 12/2009 | Holm-Peterson et al. |
| 2010/0005411 A1 | 1/2010 | Duncker et al. |
| 2010/0308102 A1* | 12/2010 | Mochizuki ............ B23K 3/033 228/8 |
| 2011/0115814 A1 | 5/2011 | Heimendinger et al. |
| 2011/0283231 A1 | 11/2011 | Richstein et al. |
| 2012/0089902 A1 | 4/2012 | Sheflin |
| 2012/0166470 A1 | 6/2012 | Baumgaertel et al. |
| 2012/0254783 A1 | 10/2012 | Pourshahid et al. |
| 2013/0009963 A1 | 1/2013 | Albrecht |
| 2013/0080444 A1 | 3/2013 | Wakefield et al. |
| 2013/0086107 A1 | 4/2013 | Genochio et al. |
| 2013/0097177 A1 | 4/2013 | Fan et al. |
| 2013/0145244 A1 | 6/2013 | Rothschiller et al. |
| 2013/0187926 A1 | 7/2013 | Silverstein et al. |
| 2013/0229416 A1 | 9/2013 | Krajec et al. |
| 2013/0232174 A1 | 9/2013 | Krajec et al. |
| 2013/0249917 A1 | 9/2013 | Fanning et al. |
| 2013/0275904 A1 | 10/2013 | Bhaskaran et al. |
| 2014/0053091 A1 | 2/2014 | Hou et al. |
| 2014/0149947 A1 | 5/2014 | Blyumen |
| 2014/0282184 A1 | 9/2014 | Dewan et al. |
| 2014/0282276 A1 | 9/2014 | Drucker et al. |
| 2014/0300603 A1* | 10/2014 | Greenfield .............. G06T 11/20 345/440 |
| 2015/0015504 A1 | 1/2015 | Lee et al. |
| 2015/0294275 A1 | 10/2015 | Richardson et al. |
| 2015/0317807 A1 | 11/2015 | Bartley et al. |
| 2015/0355835 A1 | 12/2015 | Tsukahara et al. |
| 2016/0026695 A1 | 1/2016 | Fan et al. |
| 2016/0027193 A1 | 1/2016 | Schiffer et al. |
| 2016/0055232 A1 | 2/2016 | Yang et al. |
| 2016/0055659 A1 | 2/2016 | Wilson et al. |
| 2016/0062555 A1 | 3/2016 | Ward et al. |
| 2016/0103872 A1 | 4/2016 | Prophete et al. |
| 2016/0291845 A1 | 10/2016 | Lingappa |
| 2016/0307344 A1 | 10/2016 | Monnier et al. |
| 2016/0314606 A1 | 10/2016 | Tolle et al. |
| 2016/0350951 A1 | 12/2016 | Chan et al. |
| 2017/0004638 A1 | 1/2017 | Csenteri et al. |
| 2017/0039741 A1 | 2/2017 | Bhatnagar et al. |
| 2017/0053425 A1 | 2/2017 | Lee |
| 2017/0205998 A1 | 7/2017 | Jin et al. |
| 2017/0228898 A1* | 8/2017 | Liu ........................ G06T 11/60 |
| 2017/0236312 A1 | 8/2017 | Ruble et al. |
| 2017/0300545 A1 | 10/2017 | Lee et al. |
| 2017/0344236 A1 | 11/2017 | Drucker et al. |
| 2018/0089237 A1 | 3/2018 | Dunne et al. |
| 2018/0165844 A1 | 6/2018 | Kirichenko et al. |
| 2018/0165851 A1 | 6/2018 | Apte et al. |
| 2018/0174337 A1 | 6/2018 | Menard et al. |
| 2018/0294046 A1 | 10/2018 | Kamura et al. |
| 2018/0306839 A1* | 10/2018 | Donnal ................ G01R 21/133 |
| 2018/0341392 A1 | 11/2018 | Zheng et al. |
| 2018/0349516 A1* | 12/2018 | Dutta .................... G06F 3/0484 |
| 2018/0365303 A1 | 12/2018 | Prophete et al. |
| 2019/0043228 A1 | 2/2019 | Bhat et al. |
| 2019/0065036 A1 | 2/2019 | Drucker et al. |
| 2019/0114054 A1 | 4/2019 | Kerr |
| 2019/0114055 A1* | 4/2019 | Kerr ...................... G06T 11/206 |
| 2019/0114057 A1 | 4/2019 | Kerr |
| 2019/0114308 A1 | 4/2019 | Hancock |
| 2019/0114817 A1 | 4/2019 | Kerr |
| 2019/0311812 A1 | 10/2019 | Sweeney |
| 2019/0324072 A1 | 10/2019 | Underwood |
| 2020/0004412 A1 | 1/2020 | Ahuja et al. |
| 2020/0005509 A1 | 1/2020 | Gibb et al. |
| 2020/0110394 A1 | 4/2020 | Hirata |
| 2020/0393940 A1 | 12/2020 | Stewart |
| 2021/0081663 A1 | 3/2021 | Pandit et al. |
| 2021/0256019 A1 | 8/2021 | Prophete et al. |
| 2022/0004293 A1 | 1/2022 | Stewart |
| 2022/0027555 A1 | 1/2022 | Dvorak |
| 2022/0202320 A1 | 6/2022 | Diener et al. |
| 2022/0405993 A1 | 12/2022 | Li et al. |
| 2023/0077829 A1 | 3/2023 | Lee et al. |
| 2023/0230300 A1 | 7/2023 | Yagi et al. |
| 2024/0153170 A1 | 5/2024 | Kerr et al. |
| 2024/0153171 A1 | 5/2024 | Kerr et al. |
| 2024/0169615 A1 | 5/2024 | Chen et al. |
| 2024/0265595 A1 | 8/2024 | Zhao et al. |

OTHER PUBLICATIONS

Chroma.js Color Palette Helper, available online at <https://web.archive.org/web/20210420231939/https://vis4.net/palettes/#/9|s|00429d,96ffea,ffffe0|ffffe0, ff005e,93003a|1|1>, Apr. 20, 2021, 1 page.

Github, "chroma.js", available online at <https://web.archive.org/web/20210322202649/https://gka.github.io/chroma.js/>, Mar. 22, 2021, 24 pages.

Kennedy Design, Inc., "Divergent Color Scale", available online at <https://www.learnui.design/tools/data-color-picker.html#divergent>, 2023, 3 pages.

Final Office Action, U.S. Appl. No. 17/980,476, Apr. 16, 2025, 37 pages.

Final Office Action, U.S. Appl. No. 17/980,481, Nov. 26, 2024, 93 pages.

Non-Final Office Action, U.S. Appl. No. 17/980,476, Dec. 13, 2024, 34 pages.

Non-Final Office Action, U.S. Appl. No. 17/980,479, Dec. 3, 2024, 24 pages.

(56) References Cited

OTHER PUBLICATIONS

Non-Final Office Action, U.S. Appl. No. 17/980,481, May 20, 2025, 99 pages.

* cited by examiner

AUTOMATICALLY GENERATING AXES FOR DATA VISUALIZATIONS INCLUDING DATA BOUND OBJECTS

BACKGROUND

Data visualizations, such as charts, graphs, and other visualizations, provide a schematic representation of data that communicates information about the underlying data visually. Creating a data visualization may be a complex and iterative process as it often involves alternating between data manipulation and visual design aspects of the visualization being crafted. Traditional methods of creating data visualizations include using a visualization template, manually drawing the visualization, or writing computer code to build a unique data visualization.

SUMMARY

Introduced here are techniques/technologies that enable a data-bound axis to be generated for a data visualization. For example, a data visualization, such as a chart or graph, may be generated by binding data to graphic objects on a digital canvas of a graphic processing application. When a data visualization is generated, a scale is created. This scale allows for new graphic objects to be created which have the same relationship to the underlying dataset as the existing graphic objects. For example, if the length of a rectangle is bound to a dataset, then any additional rectangle created that is similarly bound it created such that its length shares the same scale as the initial rectangle. Once a data visualization has been created, the designer can then request that an axis be generated for the data visualization.

The scale can be used to generate a data-bound axis for the data visualization. In some embodiments, the scale is used to generate an axis dataset. For example, using the minimum and maximum values of the scale, along with other properties of the data visualization, are used to calculate the axis dataset. The axis dataset includes a number of tick marks and their positions, as well as labels for the tick marks. Once the axis dataset has been created, it is bound to graphic objects and added to the digital canvas, aligned with the data visualization. Any changes to the scale of the data visualization will result in changes to the axis dataset. Because the axis is bound to the axis dataset, the axis will automatically be updated. Additionally, because the axis is made of graphic objects, the designer can modify the axis' appearance similarly to any other graphic object. This allows the look of the axis to be quickly and easily modified to match the design of the data visualization.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
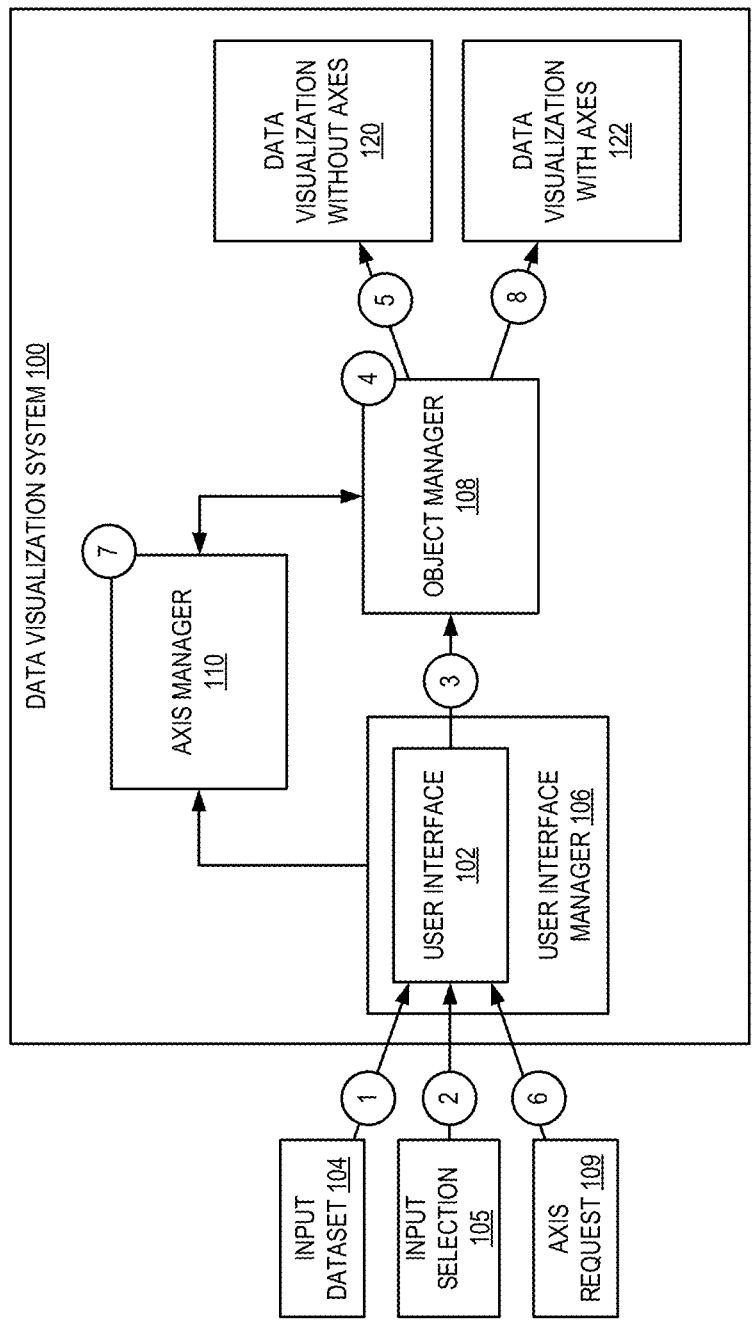
FIG. 1 illustrates a diagram of a process of generating axes for data visualizations including data bound objects in accordance with one or more embodiments.

One or more embodiments of the present disclosure are directed to the creation of graphic objects that are bound to data. Data visualizations (e.g., charts, infographics, etc.) are a tool for communicating information about a data set to viewers. Through data visualizations, information can be clearly and creatively presented. Previously, data visualization techniques were manually implemented. For example, charts and graphs that include various graphic objects were manually drawn to match a dataset. Although this provides maximum creativity, as the data visualization is drawn from scratch by the designer, it is slow and not readily applicable to new charts or datasets. For example, if changes to the underlying dataset were made, or if a new visualization were desired, the previous data visualizations had to be thrown out and new ones created. Alternatively, custom code was written to generate data visualizations from a dataset. Although such code could potentially create new data visualizations from different datasets, it requires significant technical ability, both in programming expertise and data science expertise, to create the code.

This presents the same challenge for designers who wish to change the scale of their data visualizations. For example, a designer may wish to resize an existing data visualization to fit in a new context (e.g., enlarge to fill a whole page, shrink to allow for additional related content to be shown on the same page, etc.). Such a change in scale would require both reconstruction of the data visualization at a new scale and reconstruction of the axes for the new data visualization. In prior systems, this would mean updating code to redraw the data visualization and either updating code or manually redrawing the axes. This results in significant time and labor to perform, especially where multiple data visualizations need to be reconstructed.

Embodiments enable axes to be created automatically for data visualizations by creating an axis dataset and binding graphic objects to the axis dataset. A designer creates a data visualization by binding a variable of a dataset to a visual property of a graphic object. Graphic objects may include any image or representation of an object that can be displayed in a graphical user interface (GUI) of a computing device. For example, graphic objects may include shapes, icons, text boxes, images, etc. The designer can link visual properties of the graphic object to data, such that the value of the linked data then modifies the visual properties of the graphic object. This allows for different data-driven designs to be quickly and easily created.

In addition to the data visualization, a scale object is also created based on visual characteristics of the graphic object (e.g., font size, graphic object geometry, position, color, etc.). The scale can be presented on the canvas as a control element (e.g., a "decoration") that allows the designer to quickly resize the data visualization. However, in the past such controls have not been a part of the data visualization itself, instead only appearing as a decoration on the digital canvas, and as such are not visible when the data visualization is published. Embodiments create a dataset (also referred to herein as an axis dataset) from the scale. This new axis dataset can also be bound to graphic objects, allowing for a visible axis to be created as part of the data visualization.

As such, embodiments greatly simplify the creation and management of data visualizations as compared to prior techniques which required writing custom code or manual drawing to create. Additionally, by automatically creating an axis that is made of the same graphic objects as the data visualization, the axis similarly customizable to the rest of the data visualization. This enables the designer to change the color, position, line weight, or other visual characteristics of the axis as needed to fit their design. Further, because the axis is bound to data, any changes to that data are automatically reflected in the axis. This means that if the scale of the data visualization changes, the axis dataset is updated which results in the axis (or axes) being updated as well. This makes it easy for a designer to iterate on their design, as compared to prior techniques, because the data visualization updates automatically without requiring the designer to manually redraw or update code whenever changes need to be made.

FIG. 1 illustrates a diagram of a process of generating axes for data visualizations including data bound objects in accordance with one or more embodiments. As shown in FIG. 1, a data visualization system 100 may enable designers, or other users, to generate data visualizations from underlying source data. Data visualization system 100 may be implemented as part of a graphic design application, such as a vector graphic design application, which enables designers to create various graphic objects (e.g., shapes, lines, text boxes, etc.). In some embodiments, the data visualization system 100 executes on a computing device, such as a PC, laptop, server or any other device including one or more processors capable of executing computer-readable instructions stored on a storage medium.

The data visualization system 100 includes a user interface 102 through which a designer can interact with the data visualization system to create a drawing including graphic objects and bind those graphic objects to data. The designer can create a graphical object by drawing an arbitrary shape in the user interface 102. For example, if the designer is drawing a bar chart, then the designer may use a shape tool to draw a rectangle (e.g., to represent one of the bars of the bar chart).

As shown at numeral 1, the designer may provide data to the data visualization system. The data may be input directly into the data visualization system (e.g., entered manually, copy pasted, etc.) or provided from another source, such as a file including the dataset (e.g., a spreadsheet, database, etc.). Such a file may be imported from a local storage location (e.g., on the same computing device on which the data visualization system is executing) or a remote storage location accessible via a network. The data visualization system can identify one or more variables associated with the data and present the variables to the user (e.g., via a variable or data user interface element, such as a window, overlay, etc.).

In some embodiments, when the input data set is received, one or more variables are identified from the data set. These variables may be displayed within the GUI 102 (e.g., in a variables panel, list, or other GUI element). In some embodiments, the variables are identified based on a known data format. For example, labels of columns or rows may be extracted from the dataset based on the data format associated with the dataset. The designer can then bind a variable of the dataset to a visual characteristic of one or more graphic objects.

In the example of FIG. 1, at numeral 2, the designer makes one or more input selections 105 via user interface 102. The input selections 105 may include selecting one or more graphic objects to be bound to one or more variables of the input dataset 104 and a visual characteristic of the selected graphic object to which to bind to the dataset. In some embodiments, the available visual characteristics which the design may select may include all visual characteristics relating to the type of object selected. For instance, the visual characteristics for a geometric shape object (e.g., a "shape") may include width, height, position, orientation, fill, border, opacity. In some embodiments, the area of an object may also be a bindable visual characteristic. Visual properties for an image may include one or more of the previous properties in addition to contrast and brightness properties, and a text box object may include additional properties, including font and spacing. In some embodiments, the visual characteristics available for selection are further based on the type of variable selected. For instance, a number variable type may include visual properties that with numerical property values, such as width, height, position, and orientation. Color of a fill or border may also be presented for number type variables. For text type variables, the color of a fill or border may be presented as visual property types.

There are a number of benefits to working with data bound objects rather than hard coded, or manually constructed visualizations. For example, if the underlying dataset is changed or updated, the corresponding bound visualization is likewise updated. This saves significant effort that would otherwise be required to update manually constructed charts. Additionally, no specialized coding knowledge is required to create the visualization. Instead, sophisticated data visualizations can be constructed by anyone capable of using a graphic design tool and access to the data to be visualized.

At numeral 3, the selected graphic objects and selected data binding are provided to object manager 108 by user interface manager 106. The object manager 108 is responsible for binding the visual characteristic of the selected graphic object to the selected variable. In some embodiments, there may be a visual indicator of the binding. In some embodiments, the data binding is maintained and stored by the object manager 108. In accordance with the association between the variable and the visual property, an observation within the data (such as a row in a spreadsheet) will correspond to a graphic object to which the visual property applies. In some embodiments, each data observation is mapped to a grouping of graphic objects, which may be referred to as a cell, and at least one graphic object within that cell has a visual property associated with the data variable.

At numeral 4, the object manager 108 creates additional graphic objects based on the initial graphic object such that each observation in the dataset has a corresponding graphic object. In some embodiments, additional graphic objects are created by automatically duplicating or repeating the initial graphic object such that the object type is the same as the initial graphic object. The additional graphic objects may be automatically created and displayed when the designer binds a data variable to a visual property of the initial graphic object. Alternatively, after the binding the designer may instruct the data visualization system to create the additional graphic objects (e.g., by selecting a GUI element). In either event, at numeral 5, a data visualization without axes 120 is then generated. This data visualization includes a plurality of graphic objects that were generated based on the initial graphic object and bound to the same variable of the dataset 104.

As each object within the plurality of graphic objects is created, the visual property for the object is rendered in accordance with the binding. Specifically, the value for the visual property of a graphic object is based on a variable value for the corresponding observation. The new graphic objects may be created such that they are aligned with the initial graphic object in both position and scale. For example, a new coordinate system may be established based on the position of the initial graphic object. This allows each new graphic object to share an origin with the initial graphic object, allowing for the initial object and new objects to all be aligned along one axis. Additionally, the visual characteristic of each new graphic object is set such that the value the new graphic object is representing is appropriate relative to the initial graphic object. For example, where the initial graphic object is a bar, the origin may be set to the left edge of the bar. Other origins may also be used, either selected automatically by the data visualization system, by the designer, etc. If the data is bound to the length of the bar, then each newly generated bar's length will be set such that each bar represents that length on the same scale as the initial bar. These new graphic objects may be aligned and rendered within the user interface 102.

Using the new coordinate system, the object manager 108 creates a scale for the data visualization. The scale maps the values represented by the data to the size of the graphic objects. For example, the scale may map the value represented by the bound dataset to the length of the rectangular geometric shape object to which it is bound. Alternatively, a number of pixels or other characteristics of the graphic object may be mapped to the data value. In some embodiments, this scale is presented visually as an axis control. The designer can interact with the axis control to increase or decrease the scale, resulting in the size of the graphic objects bound to the same dataset to be adjusted accordingly. The axis control is a decoration, which is it is visible on the digital canvas of the user interface 102 to the designer, but is not visible when published (e.g., printed, exported, etc.). However, data visualizations, such as charts, are often accompanied with one or more axes which provide context to the data visualization by indicating what is being represented. The scale can provide a dataset from which a bound axis can be generated.

At numeral 6, the designer requests axis generation 109. For example, the designer may select all or a portion of the data visualization and then select a GUI element corresponding to axis generation. Such an action may invoke axis manager 110. At numeral 7, axis manager 110 obtains the scale from object manager 108 for the selected data visualization. For example, in some embodiments, the axis manager is provided with an identifier or other information used to determine the data visualization corresponding to the selected graphic object(s). Using the scale and visual characteristics of the data visualization, the axis manager generates an axis dataset. For example, the axis dataset may be calculated based on the size of a label font (e.g., a selected font size, last used font size, etc.). These visual characteristics are used to create a plurality of tick marks and numerical/categorical text labels associated with the tick marks.

Once the new axis dataset has been generated, the object manager 108 binds the axis dataset to axis graphic objects, including text boxes and lines (e.g., tick marks) and adds the axis graphic objects to the canvas. This results in data visualization with axes 122, at numeral 8. The axis graphic objects have the same behavior of other graphic objects, they can be modified or deleted by the designer. For example, the tick marks can be extended to create long lines or grids. Additionally, the font, line stroke weights, colors, etc. can be similarly edited. Additionally, where a data visualization has multiple axes, an axis dataset is created separately for each axis. This allows for independent control of the appearance of each axis, providing more fine grain control over their appearances.

Figure 2:
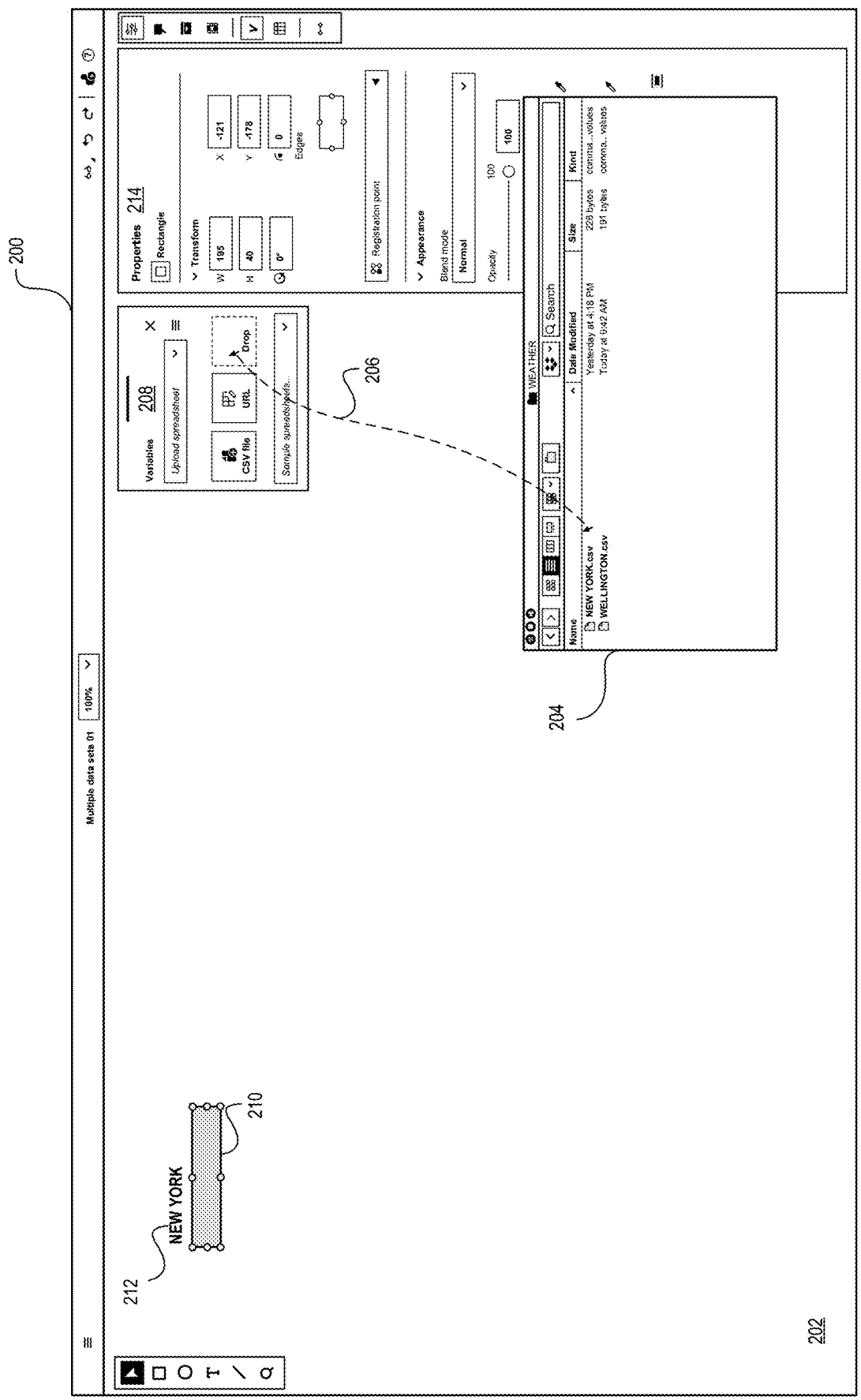
FIG. 2 illustrates a diagram of a user interface that enables generating a data visualization from data bound objects in accordance with one or more embodiments.

FIG. 2 illustrates a diagram of a user interface 200 that enables generating a data visualization from data bound objects in accordance with one or more embodiments. As shown in FIG. 2, the user interface 200 can include a digital canvas 202 which provides an area in which the designer can draw graphic objects, create data visualizations, etc. As discussed, the designer can provide a dataset to be bound to graphic objects. In the example of FIG. 2, the designer has local datasets NEW YORK.csv and WELLINGTON.csv, as shown at 204. In this instance, the designer provides the NEW YORK.csv dataset by dragging and dropping 206 the dataset into variables panel 208. Additionally, in the example of FIG. 2, the designer has drawn a rectangle geometric shape 210 and a text box 212 including the text NEW YORK. The rectangle 210 has been selected, which results in properties panel 214 showing various properties of the rectangle (e.g., width, height, position, etc.).

Figure 3:
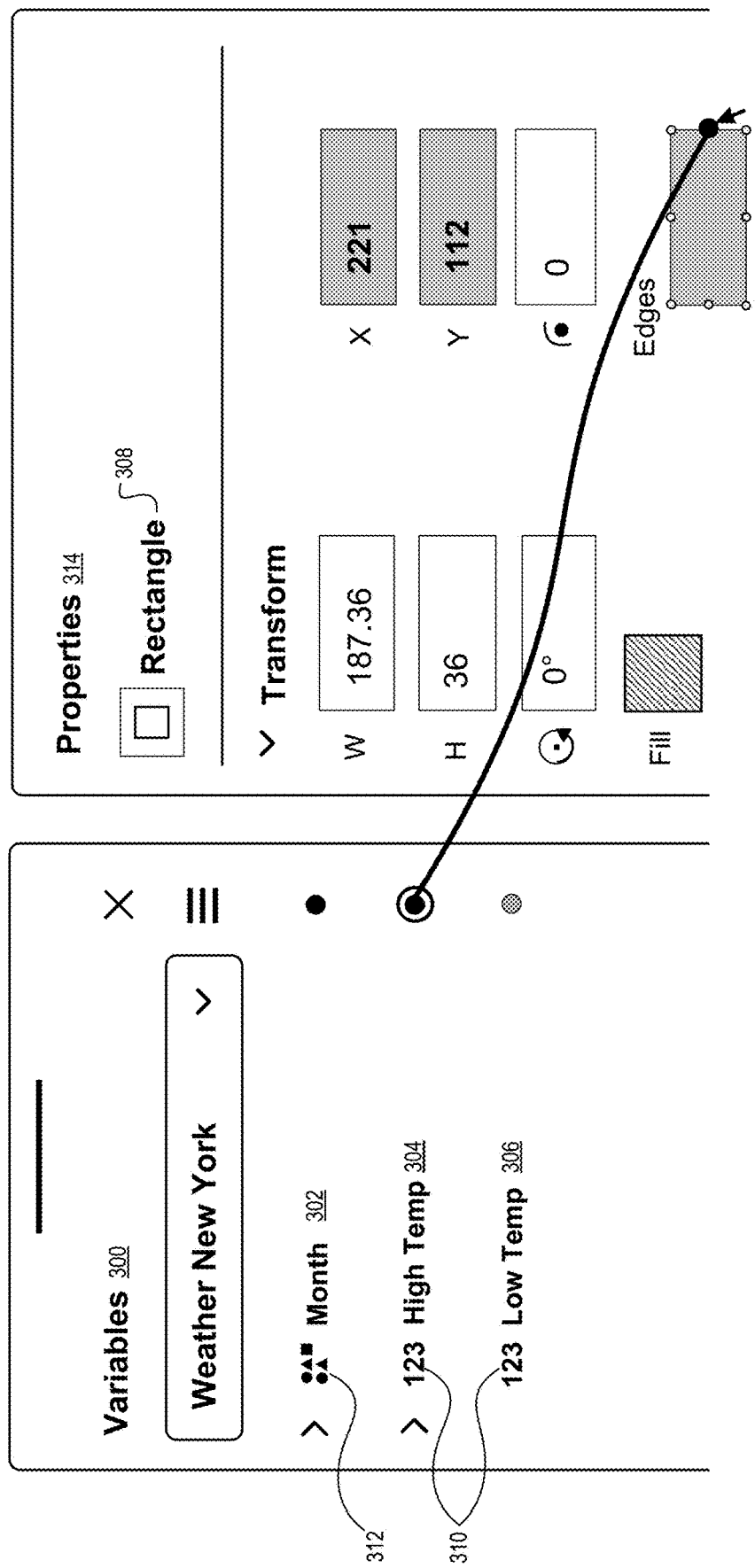
FIG. 3 illustrates an example of binding data to a property of a graphic object in accordance with one or more embodiments.

FIG. 3 illustrates an example of binding data to a property of a graphic object in accordance with one or more embodiments. Continuing the example from FIG. 2, once the dataset has been provided, the data visualization system identifies variables associated with the dataset. This is reflected in variables panel 300, which now shows three variables associated with the dataset: month 302, high temp 304, and low temp 306. Additionally, the variables panel further identifies a type associated with each variable. For example, high temp 304 and low temp 306 are indicated as being numerical types 310 while month 302 is indicated as being categorical type 312.

As discussed, the designer can bind variables from the dataset to visual characteristics of a graphic object. In this example, the available properties of the rectangle 308 are shown in properties panel 314. In particular, the greyed-out properties are available for binding (e.g., position, fill, and edges). In this instance, the high temperature variable 304 is being bound to the right edge 314 of the selected graphic object (in this case rectangle 308). Although FIG. 3 shows binding being performed between the variables panel 300 and the properties panel 314, in various embodiments such binding may be performed from the variables panel to the graphic object directly on the digital canvas, e.g., by selecting the high temp variable (or other variable of interest) and linking it to the right edge of the graphic object.

Figure 4:
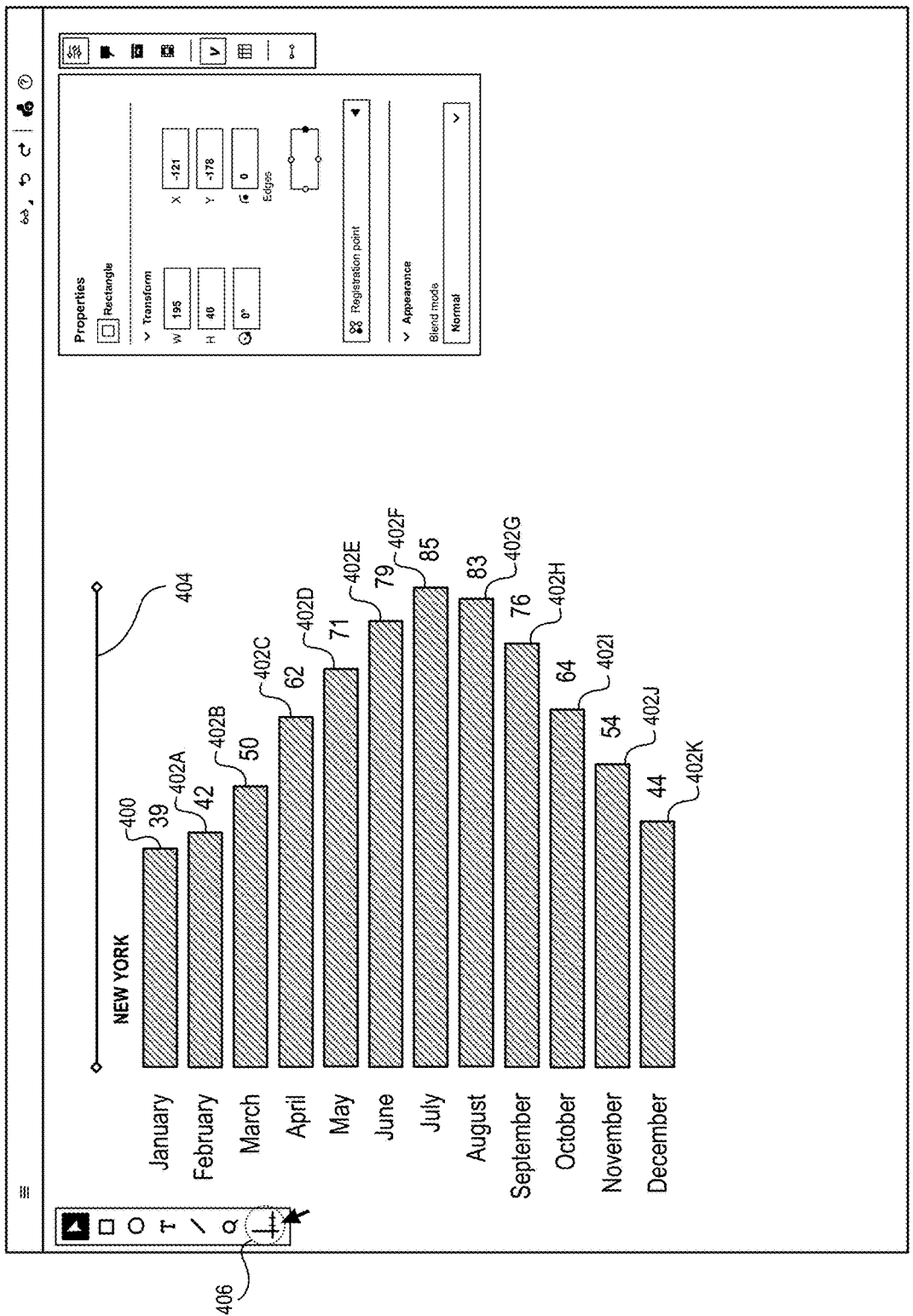
FIG. 4 illustrates an example of a data visualization in accordance with one or more embodiments.

FIG. 4 illustrates an example of a data visualization in accordance with one or more embodiments. As shown in FIG. 4, following the binding operation illustrated in FIG. 3, additional graphic objects 402A-402K have been created and populated alongside original graphic object 400. As discussed with respect to FIG. 3, the right edge of each bar is bound to a variable from the dataset. In this instance, the variable is the high temp variable from the NEW YORK.csv dataset. The data visualization created multiple new bars and bound them to variable values based on the dataset. For example, because the dataset includes average monthly high temperatures for New York City, the high temperature variable is identified having twelve observations (e.g., one for each month). As such, eleven new bars are created and bound to the dataset, with the right edge of each bar corresponding to the average temperature value for a corresponding month. The resulting chart may also be annotated with various labels. For example, the name of each month may be added to the chart, placed in such a way that the label is associated with its corresponding bar.

Additionally, as discussed, each graphic object is generated having a scale established by the first graphic object. In this example, the length of the original rectangle 400 and the corresponding temperature value for January determine a scale (e.g., length/degree) that is then applied to each new rectangle 402A-402K that is created. Additionally, a scale decoration 404 is created. If the designer changes the length of the scale decoration 404 the bars will shrink or grow accordingly.

The data visualization of FIG. 4, as-is, has no explicit axes. Although the scale decoration approximates an axis, it is not a visible element of the data visualization, but only a design tool. Traditionally, a designer would have to manually create, or specially code, an axis for their data visualization, either before the data visualization was created or after. Any changes to the data visualization would then render that axis useless, as a new axis would need to be created. In accordance with various embodiments, a designer can request one or more axes be automatically generated via the user interface. For example, the designer may select an axis generation user interface element (such, as an icon, menu option, or other element) and an axis is automatically generated. In some embodiments, if only a single data visualization is present on the canvas, then an axis is generated for that data visualization. If multiple data visualizations are present, then the designer may first select all or a portion of the data visualization for which an axis is to be generated, prior to requesting the axis generation.

Figure 5:
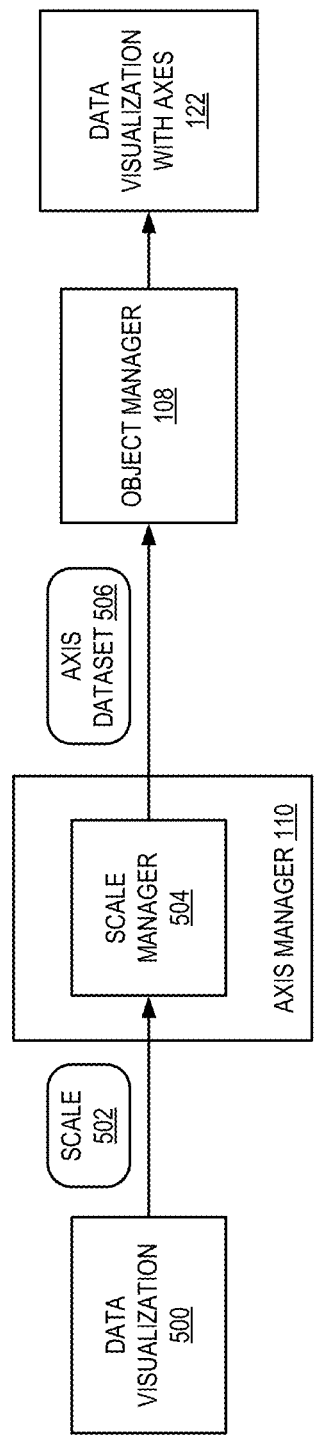
FIG. 5 illustrates an example of generating an axis dataset in accordance with one or more embodiments.

FIG. 5 illustrates an example of generating an axis dataset in accordance with one or more embodiments. As discussed, when a data visualization is created a scale is implicitly generated which maps the visual characteristics of the graphic objects that comprise the data visualization to the data values those graphic objects represent. This allows for new graphic objects that are sized correctly, relative to the existing graphic object(s), to be created for each observation found in the bound dataset. When the designer requests an axis to be created for a data visualization 500, axis manager 110 obtains the scale 502 associated with the data visualization 500. As discussed, the scale may be a mapping of a visual characteristic to data values. For example, the scale may be a set of discrete values mapping a visual characteristic (e.g., object length) value X to data value Y extrapolated out over a plurality of values. Alternatively, the scale may be represented by a formula, algorithm, etc. which for a given visual characteristic value (or data value) returns a corresponding data value (or visual characteristic value). The scale may be linear, logarithmic, etc. In various embodiments, the scale may also include a minimum value and a maximum value, and a length.

In various embodiments, the scale 502 is obtained by identifying the selected data visualization and retrieving its corresponding scale (e.g., using a data visualization identifier or other information). The scale 502 is received by scale manager 504. Scale manager 504 can use the scale 502 and font information to create an axis dataset 506. The font information (e.g., a font and font size) can be determined automatically (e.g., the last font used) or can be a user-defined option (e.g., the user may be prompted via the GUI to indicate a desired font and font size). The font size is used with the minimum, maximum, and length values of the scale to determine the spacing between tick marks on the axis, and therefore the number of ticks to be included in the axis. Additionally, the values for the tick marks are also determined by the scale manager 504. The values for the tick marks may by default include whole numbers that do not overlap with the axis. Alternatively, the designer may specify the number of significant digits that can be used in the tick mark values.

Once the axis dataset 506 has been created, it is provided to object manager 108. Object manager 108 then creates one or more graphic objects and binds them to the axis dataset 506. This may include lines that represent the tick marks and text boxes that include the numerical label data. The axis graphic objects are added to the digital canvas with the data visualization. In some embodiments, the axis graphic objects are associated with the data visualization (e.g., given an identifier or other information that links the axis graphic objects to the data visualization). The axis graphic objects may also be aligned with the data visualization such that the tick marks are correctly positioned relative to the data values represented in the data visualization.

Figure 6:
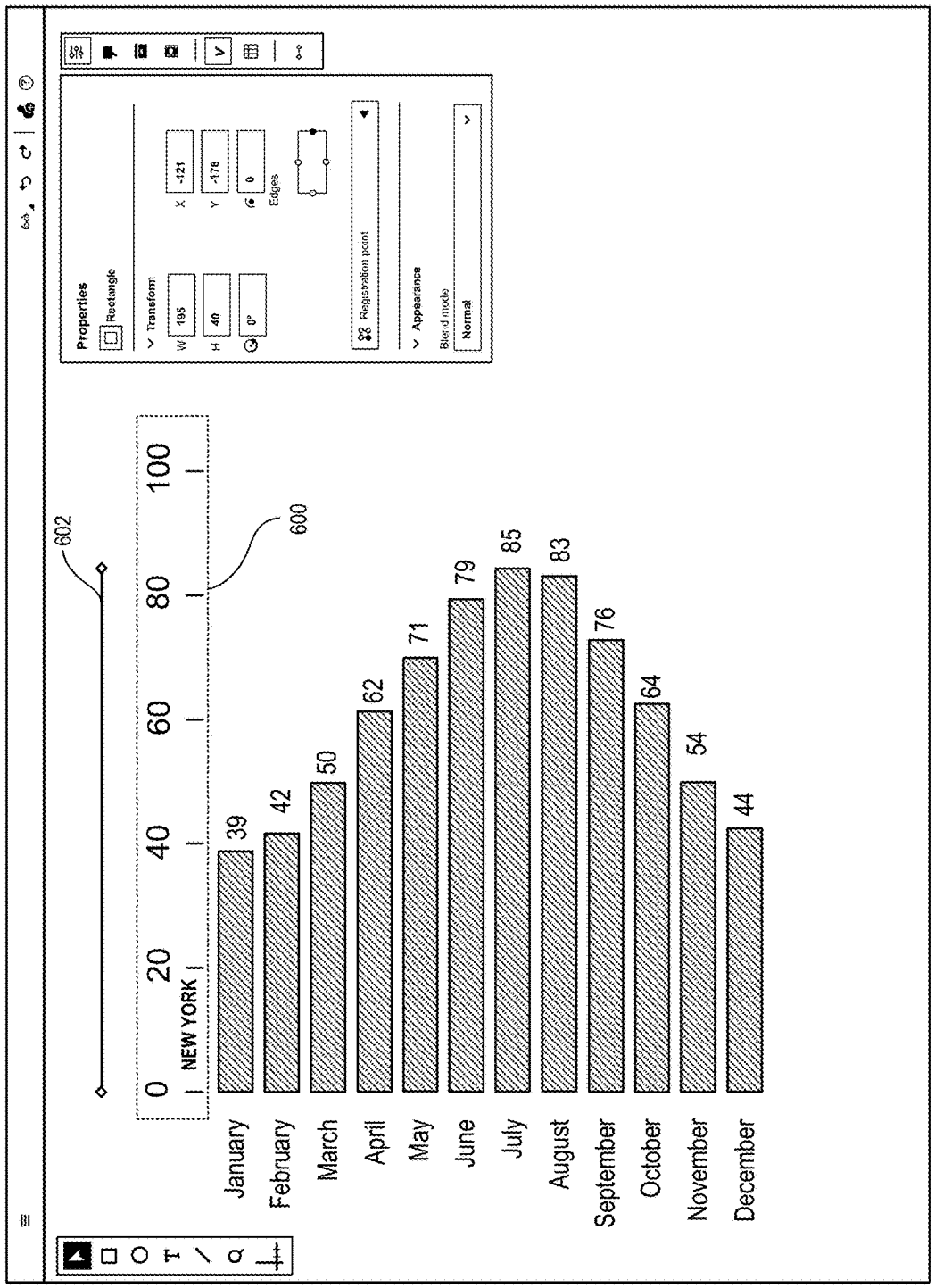
FIGS. 6-8 illustrate an example of modifying an axis bound to the axis dataset in accordance with one or more embodiments.
Figure 7:
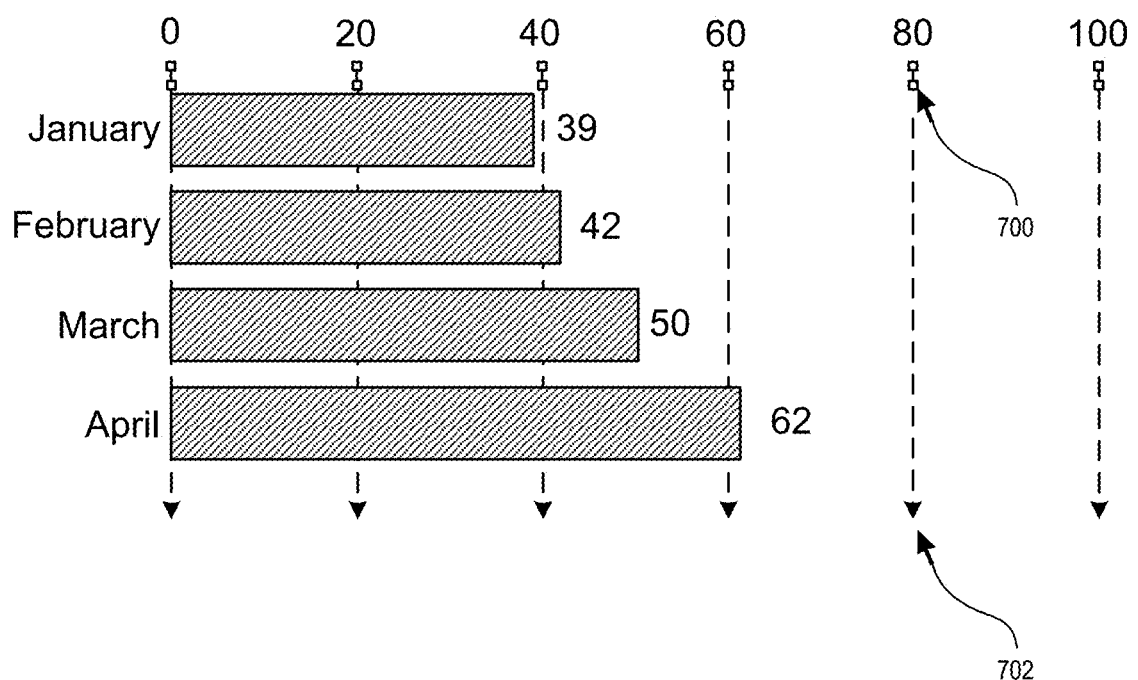
Figure 7:
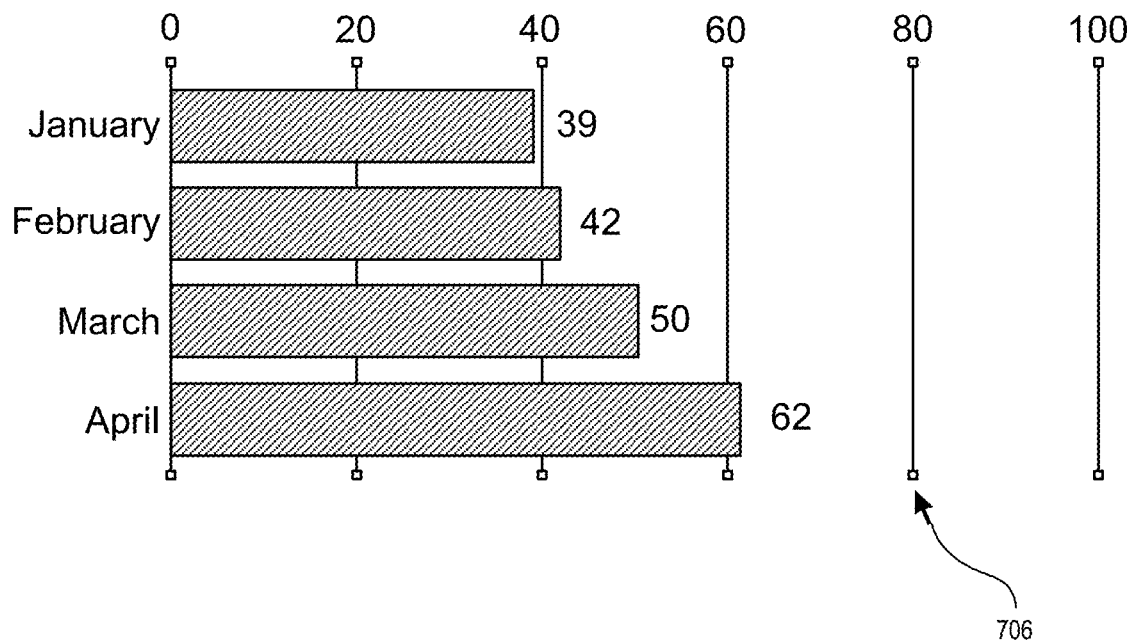
Figure 8:
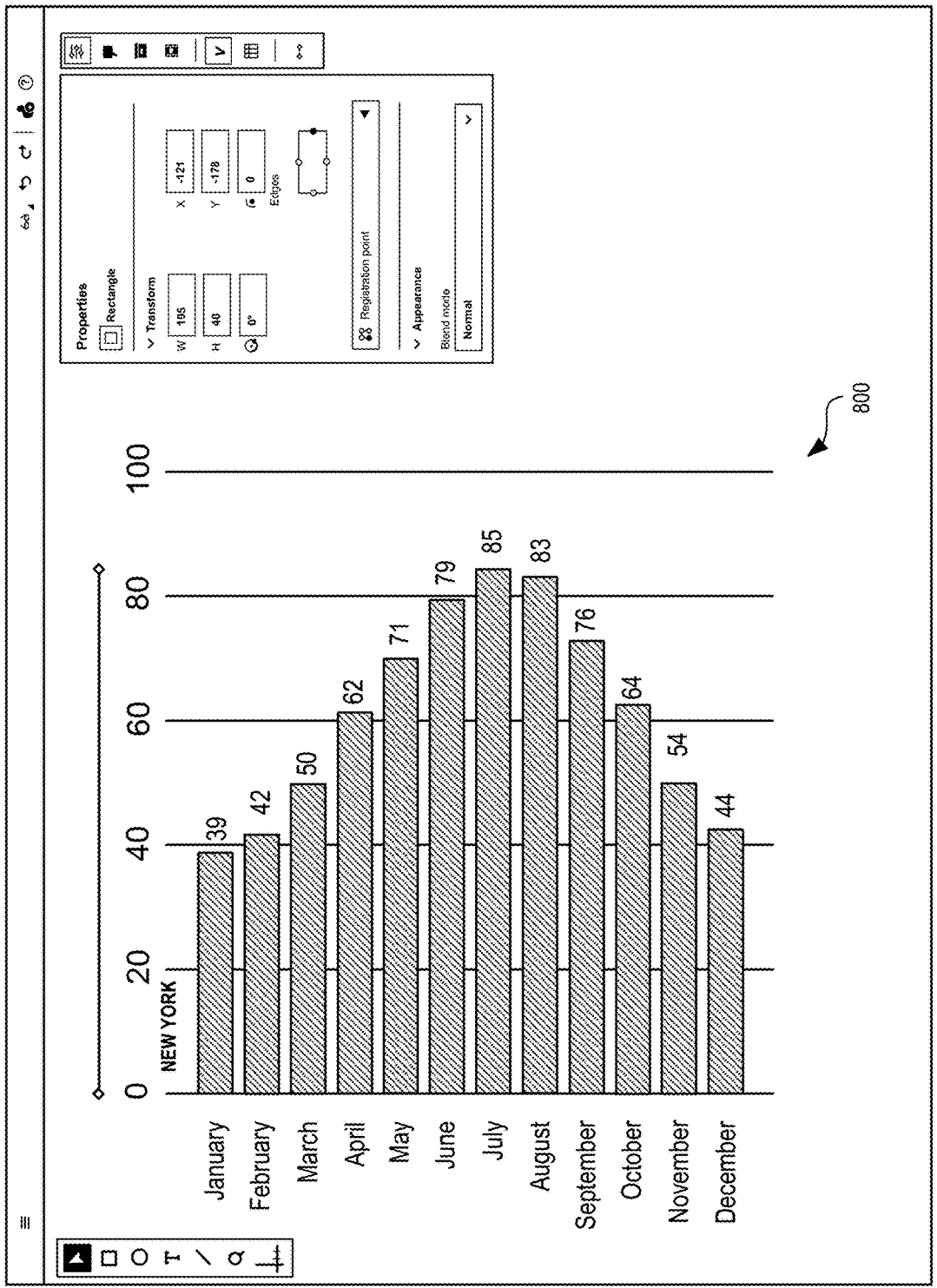

FIGS. 6-8 illustrate an example of modifying an axis bound to the axis dataset in accordance with one or more embodiments. As shown in FIG. 6, axis 600 has been added to the data visualization. Note that although the label NEW YORK is included within the bounding box indicating the axis 600, this was a preexisting label on the data visualization. The axis includes a plurality of tick marks (e.g., lines) calculated to be at intervals of twenty. Additionally, text boxes featuring the numerical value of each tick mark are also included. The size of the font used for the text boxes, and the tick mark locations, ensure that the labels do not overlap each other or the tick marks.

Additionally, the axis 600 is aligned such that it starts at a zero point that is shared by the bars that comprise the data visualization. In some embodiments, if the bars do not share a zero point, the axis may be aligned with one of the graphic objects (e.g., a selected object, the original graphic object, etc.). For example, in FIG. 6 if the bars did not share a zero point, then the axis may be aligned with the January bar. In some embodiments, the axis 600 may start and end based on the minimum and maximum values of the dataset. Alternatively, the axis 600 may automatically be extended beyond the values of the dataset. In the example of FIG. 6, the dataset only includes positive numbers so the axis minimum may be automatically set to zero, while the axis maximum is set to a value greater than 85. Alternatively, the axis minimum and maximum may be equal to the dataset minimum and maximum. In some embodiments, the axis minimum and maximum may be configurable by the designer.

In addition to the axis, the scale decoration 602 may remain present on the digital canvas. This allows the designer to change the scale of the data visualization as needed. Because the axis is bound to the scale dataset, any changes to the scale will be automatically reflected in the axis of the data visualization.

Because the axis is comprised of graphic objects, they can be manipulated like any other graphic objects to change their size, position, color, stroke width, etc. In the example of FIG. 7, the tick marks are extended to create grid lines running the length of the data visualization. For example, the designer may select an anchor point of one of the tick marks, as shown at 700. The designer can then extend the tick mark by dragging the anchor point to a new position 702. This results in an extended tick mark as shown at 706. In some embodiments, the tick marks may all be linked such that a change to one tick mark is reflected in every tick mark associated with the axis. This may exclude changes such as deleting or relocating a particular tick mark from the axis (e.g., deleting one tick mark may not result in all tick marks being deleted). FIG. 8 shows the resulting data visualization 800 with the tick marks extended to form lines running the length of the data visualization.

Figure 9:
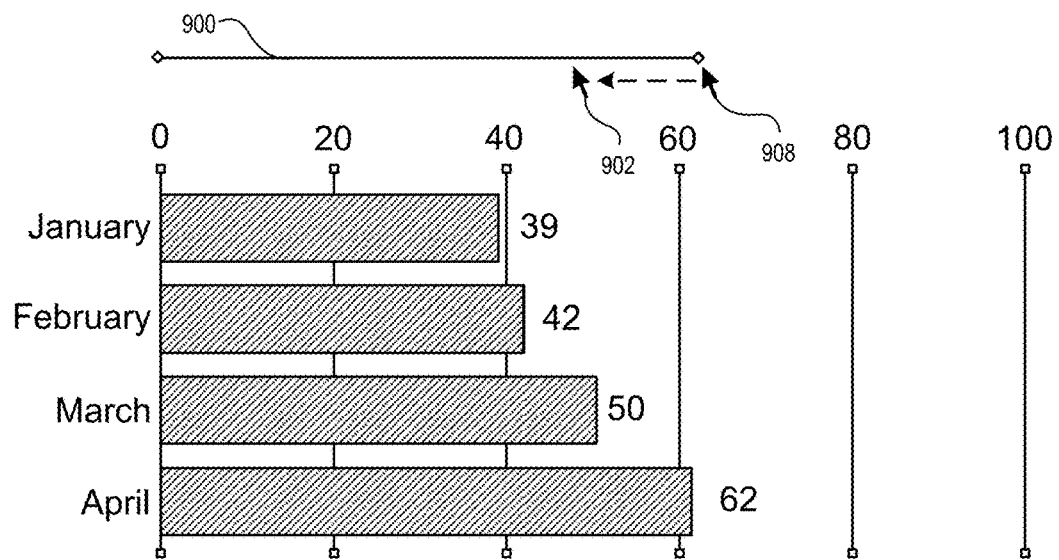
FIG. 9 illustrates an example of updating an axis in response to a change in scale of a data visualization in accordance with one or more embodiments.
Figure 9:
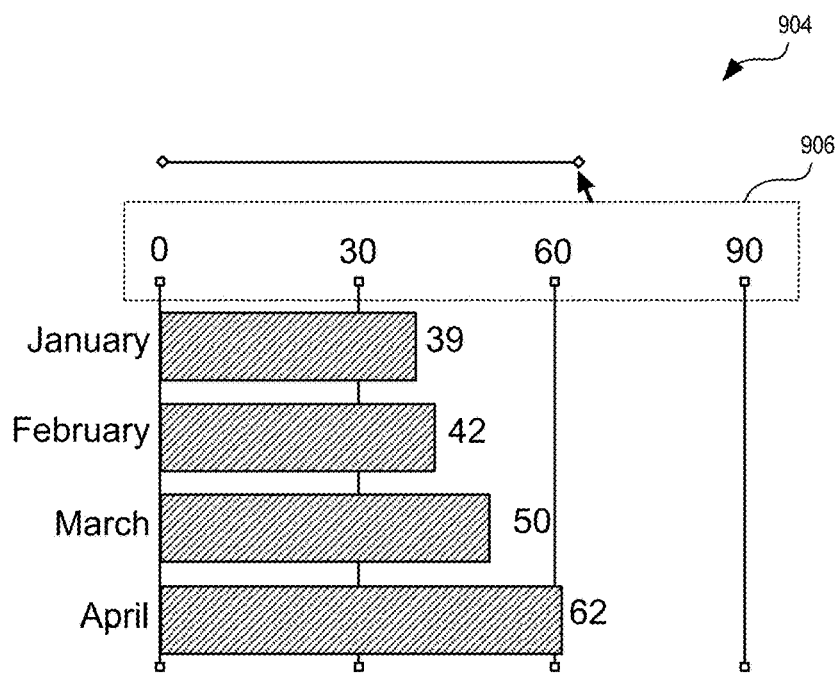

FIG. 9 illustrates an example of updating an axis in response to a change in scale of a data visualization in accordance with one or more embodiments. As noted above, the scale may be modified by the user, such as by interacting with the scale decoration 900. In the example of FIG. 9, the scale is reduced by selecting an anchor point 908 and dragging it to a new position 902. This results in a compressed data visualization as shown at 904. As shown, the compressed data visualization 904 has a new axis 906 with different labels. This is a result of the axis dataset being recalculated. As discussed above, the scale is used to calculate the axis dataset which is then bound to the graphic objects that form the axis. When the scale is changed, the axis dataset is recalculated, resulting in a modified axis dataset. Because the axis 906 is bound to this dataset, the axis is recomputed dynamically. In this instance, that results in fewer tick marks at new positions (e.g., at every 30 degrees rather than every 20 degrees). Likewise, were the scale increased, then more tick marks may be generated along with corresponding labels.

Figure 10:
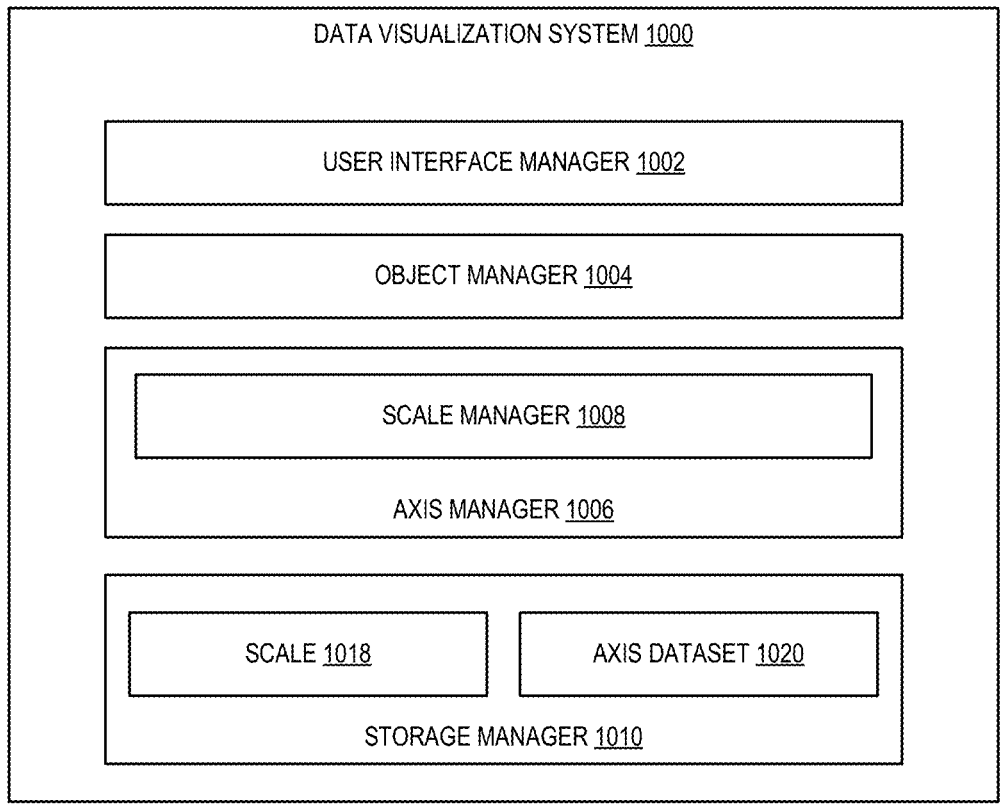
FIG. 10 illustrates a schematic diagram of a data visualization system in accordance with one or more embodiments.

FIG. 10 illustrates a schematic diagram of data visualization system 1000 (e.g., "data visualization system" described above) in accordance with one or more embodiments. As shown, the data visualization system 1000 may include, but is not limited to, user interface manager 1002, object manager 1004, axis manager 1006, and storage manager 1010. The axis manager 1006 includes scale manager 1008. The storage manager 1010 includes scale 1018 and axis dataset 1020.

As illustrated in FIG. 10, the data visualization system 1000 includes a user interface manager 1002. For example, the user interface manager 1002 allows users to create graphic objects and bind them to data to create data visualizations. In some embodiments, the user interface manager 1002 provides a user interface through which the user can interact with the data visualization system and individual data visualizations, as discussed above. Alternatively, or additionally, the user interface may enable the user to download data visualizations from a local or remote storage location (e.g., by providing an address (e.g., a URL or other endpoint) associated with a storage location).

Additionally, the user interface manager 1002 allows users to request the data visualization system 1000 to create an axis for a data visualization. The axis creation request can be received via a user interface element, such as an axis creation icon. Alternatively, the axis creation request can be made via a menu, panel, or other user interface element. The data visualization system 1000 then obtains the scale 1018 and generates an axis dataset 1020 for the data visualization. As discussed, the axis dataset is bound to graphic objects to create the axis which is then rendered with the data visualization via the user interface and can be further interacted with/edited by the designer.

As illustrated in FIG. 10, the data visualization system 1000 includes an object manager 1004. The object manager 1004 is responsible for binding graphic objects to a dataset. In particular, the object manager can be used to construct a data visualization from scratch, as discussed above. For example, the object manager 1004 binds a visual characteristic of a graphic object to a variable from a dataset. In some embodiments, there may be a visual indicator of the binding. In some embodiments, the data binding is maintained and stored by the object manager. The binding means that a change to the data in the dataset to which it is bound results in a change to the visual characteristic of the graphic object. Further, when the data is bound to a graphic object, if the variable is associated with multiple observations, then multiple graphic objects may be created and bound, each having the same visual characteristic bound to the dataset. Additionally, the object manager 1004 can create an axis comprising graphic objects bound to an axis dataset created by axis manager 1006.

As illustrated in FIG. 10, the data visualization system 1000 includes axis manager 1006. The axis manager 1006 is responsible for generating an axis dataset 1020 for a data visualization. As discussed, when an axis creation request is received, the scale 1018 associated with the data visualization is obtained by the axis manager 1006. The scale defines how the visual characteristic(s) of a graphic object relate to the data values it represents. The axis manager 1006 includes scale manager 1008 which determines number and location of graphic objects that will be bound to the axis dataset 1020. This includes the number of tick marks and labels. The axis dataset may include a discrete number of points that comprise the axis, the tick marks, and text boxes that include the value labels corresponding to the tick marks. In some embodiments, font characteristics (e.g., font type, size, etc.) are also used when calculating the axis dataset. Once complete, the object manager 1004 binds the graphic objects to the axis dataset and creates the axis which is then presented in the user interface along with its associated data visualization.

As illustrated in FIG. 10, the data visualization system 1000 also includes the storage manager 1010. The storage manager 1010 maintains data for the data visualization system 1000. The storage manager 1010 can maintain data of any type, size, or kind as necessary to perform the functions of the data visualization system 1000. The storage manager 1010, as shown in FIG. 10, includes the scale 1018. As discussed, scale 1018 can include data that represents how a visual characteristic of a graphic object relates to a data value from a dataset to which the graphic object is bound. The scale may include a set of discrete values ranging from a scale minimum to a scale maximum or may be represented by a formula bound by a scale minimum and scale maximum. The scale minimum and maximum may be the same as, or different than, the maximum and minimum values of the associated dataset.

As further illustrated in FIG. 10, the storage manager 1010 also includes axis dataset 1020. As discussed, the axis dataset is calculated based on the scale and font characteristics (e.g., size, type, etc.). The font characteristics may be determined from the last font used, selected by the designer, default values set by the data visualization system 1000, etc.

Additionally, number values to be used with the axis are determined which may affect the location, frequency, etc. of tick marks for the axis. In some embodiments, the number values may be calculated automatically, set by the designer, and/or later edited by the designer. As discussed, if the user changes the scale of the data visualization, the axis dataset is recalculated, leading to the generation of a new axis.

Each of the components 1002-1010 of the data visualization system 1000 and their corresponding elements (as shown in FIG. 10) may be in communication with one another using any suitable communication technologies. It will be recognized that although components 1002-1010 and their corresponding elements are shown to be separate in FIG. 10, any of components 1002-1010 and their corresponding elements may be combined into fewer components, such as into a single facility or module, divided into more components, or configured into different components as may serve a particular embodiment.

The components 1002-1010 and their corresponding elements can comprise software, hardware, or both. For example, the components 1002-1010 and their corresponding elements can comprise one or more instructions stored on a computer-readable storage medium and executable by processors of one or more computing devices. When executed by the one or more processors, the computer-executable instructions of the data visualization system 1000 can cause a client device and/or a server device to perform the methods described herein. Alternatively, the components 1002-1010 and their corresponding elements can comprise hardware, such as a special purpose processing device to perform a certain function or group of functions. Additionally, the components 1002-1010 and their corresponding elements can comprise a combination of computer-executable instructions and hardware.

Furthermore, the components 1002-1010 of the data visualization system 1000 may, for example, be implemented as one or more stand-alone applications, as one or more modules of an application, as one or more plug-ins, as one or more library functions or functions that may be called by other applications, and/or as a cloud-computing model. Thus, the components 1002-1010 of the data visualization system 1000 may be implemented as a stand-alone application, such as a desktop or mobile application. Furthermore, the components 1002-1010 of the data visualization system 1000 may be implemented as one or more web-based applications hosted on a remote server. Alternatively, or additionally, the components of the data visualization system 1000 may be implemented in a suite of mobile device applications or "apps."

Figure 11:
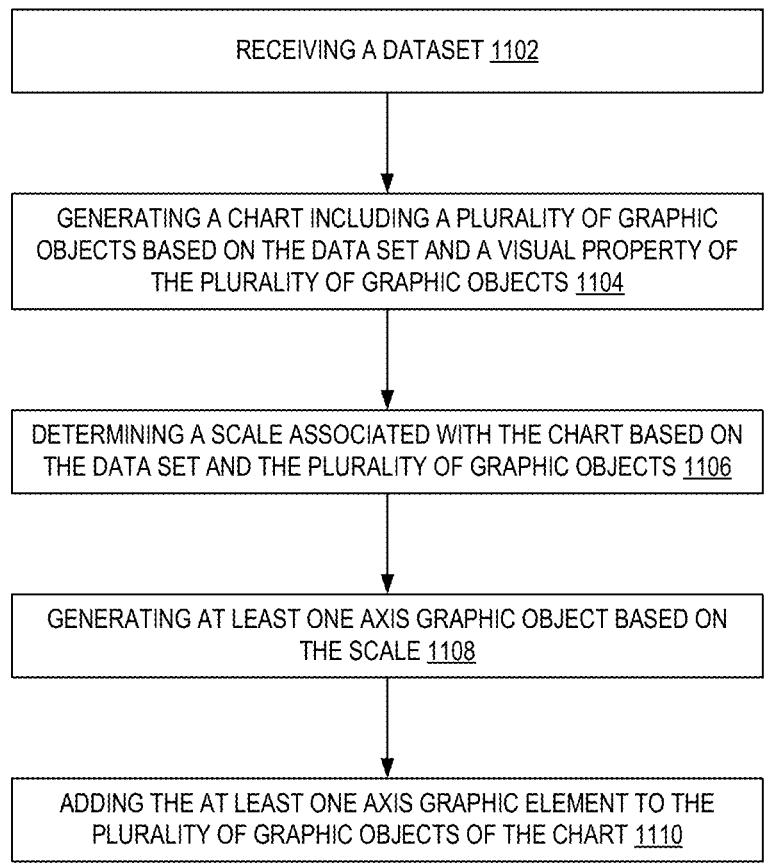
FIG. 11 illustrates a flowchart of a series of acts in a method of generating a data-bound axis for a data visualization in accordance with one or more embodiments.

FIGS. 1-10, the corresponding text, and the examples, provide a number of different systems and devices that allows a user to change coordinate systems for data bound objects. In addition to the foregoing, embodiments can also be described in terms of flowcharts comprising acts and steps in a method for accomplishing a particular result. For example, FIG. 11 illustrates a flowchart of an exemplary method in accordance with one or more embodiments. The method described in relation to FIG. 11 may be performed with fewer or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart 1100 of a series of acts in a method of generating a data-bound axis for a data visualization in accordance with one or more embodiments. In one or more embodiments, the method 1100 is performed in a digital medium environment that includes the data visualization system 1000. The method 1100 is intended to be illustrative of one or more methods in accordance with the present disclosure and is not intended to limit potential embodiments. Alternative embodiments can include additional, fewer, or different steps than those articulated in FIG. 11.

As illustrated in FIG. 11, the method 1100 includes an act 1102 of receiving a data set. As discussed, the designer can upload a dataset from a data source (e.g., a local or remote storage location), enter the dataset directly into a graphic design application, or other data visualization system, copy and paste the data from another application, etc. For example, the graphic design application may include a user interface through which the designer can drag and drop a dataset to add it to the digital canvas of the graphic design application. In some embodiments, the dataset is parsed by the data visualization system to identify one or more variables associated with the dataset. The variables may be presented to the designer in the user interface via a variables panel or other GUI element.

As illustrated in FIG. 11, the method 1100 also includes an act 1104 of generating a chart including a plurality of graphic objects based on the data set and a visual property of the plurality of graphic objects. In some embodiments, the designer creates a graphic object on the digital canvas. For example, the designer may create a shape, such as a rectangle, circle, etc. The designer then binds a visual characteristic of the graphic object to a variable of the dataset. For example, the length of a rectangle may be bound to a data value from the dataset to create a bar chart. Each observation associated with the variable (such as each row of a table dataset) can be used to create and bind a new graphic object. This results in a data visualization (e.g., a chart) that represents the dataset and is bound to it, such that changes to the dataset are reflected in changes to the bound visual characteristic of the graphic objects.

As illustrated in FIG. 11, the method 1100 also includes an act 1106 of determining a scale associated with the chart based on the data set and the plurality of graphic objects. As discussed, when a graphic object is bound to a dataset, the visual characteristic of the bound object corresponds to a value from the dataset. This results in a mapping between the visual characteristic and the data value (e.g., a scale). In some embodiments, the properties of the scale include a minimum and maximum value, a length, etc. The scale minimum and maximum may correspond to the same values as the maximum and minimum value of the dataset or different values. The scale may be discrete (e.g., a mapping of a plurality of visual characteristic values to data values) or continuous (e.g., a formula that defines the mapping at any given input value).

As illustrated in FIG. 11, the method 1100 also includes an act 1108 of generating at least one axis graphic object based on the scale. In some embodiments, generating at least one axis graphic object based on the scale, further includes generating a new data set based on the scale, determining a number of axis graphic objects based on properties of the scale and properties of the chart, generating one or more axis graphic objects equal to the number of axis graphic objects, and binding the one or more axis graphic objects to the new data set. As discussed, using the scale an axis dataset is created. The axis dataset may include a maximum and minimum value and one or more tick marks. The position of the tick marks may be determined based on the size and font of the labels created to be associated with the tick marks. For example, the tick marks are spaced to ensure the labels do not overlap, correspond to round numbers, etc. The axis graphic objects are created and bound to the axis dataset. As a result, if the axis dataset changes (e.g., due to a change in scale of the data visualization) then a new axis is created or the existing axis is updated accordingly. In some embodiments, the at least one axis graphic object includes the same types of graphic objects as the chart. For example, the axis may include geometric shapes, path objects, text boxes, etc.

As illustrated in FIG. 11, the method 1100 also includes an act 1110 of adding the at least one axis graphic element to the plurality of graphic objects of the chart. Once the axis graphic objects are created and bound to the axis dataset they are added to the digital canvas, aligned with the data visualization, as discussed. In some embodiments, the properties of the chart include a font size, wherein the font is determined a number of tick marks represented by the one or more axis graphic objects.

In some embodiments, the method further includes resizing the chart based on a user input and updating the at least one axis graphic object based on the resized chart. As discussed, the chart may be resized using the scale decoration on the digital canvas. For example, updating the at least one axis graphic object based on the resized chart may include updating the scale based on the user input and resizing the at least one axis graphic object based on the updated scale. This results in a change of the chart's scale. When the scale is changed, the axis dataset is recalculated, and the bound axis graphic objects are updated accordingly.

In some embodiments, the method further includes receiving a selection of the at least one axis graphic object and changing an appearance of the at least one axis graphic object based on a user input. For example, the axis may include a plurality of tick marks, these may be repositioned, extended, changed in color or stroke weight, or otherwise modified and these changes are reflected in the axis of the chart.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
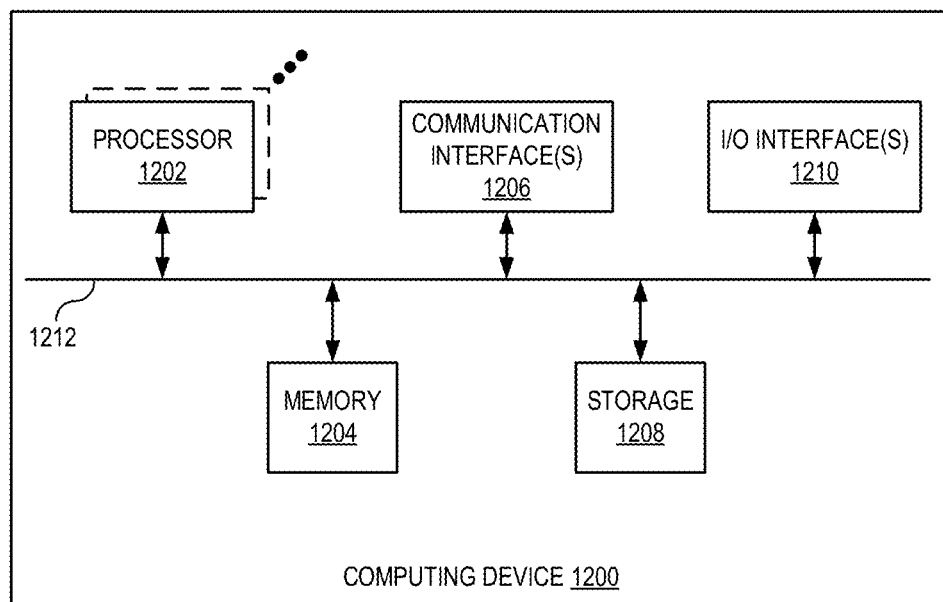
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the data visualization system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving a data set;
generating a chart including a plurality of graphic objects based on the data set and a visual property of the plurality of graphic objects;
determining a scale associated with the chart based on the data set and the plurality of graphic objects;
generating, by an axis manager, an axis dataset, the axis dataset defining properties of at least one axis for the chart based on the scale associated with the chart and the plurality of graphic objects;
generating, by an object manager, at least one axis graphic object based on the axis dataset; and
adding the at least one axis graphic object to the plurality of graphic objects of the chart.

2. The method of claim 1, further comprising:
resizing the chart based on a user input; and
updating the at least one axis graphic object based on the resized chart.

3. The method of claim 2, wherein updating the at least one axis graphic object based on the resized chart, further comprises:
updating the scale based on the user input; and
resizing the at least one axis graphic object based on the updated scale.

4. The method of claim 1, wherein generating at least one axis graphic object based on the scale, further comprises:
generating a new data set based on the scale;
determining a number of axis graphic objects based on properties of the scale and properties of the chart;
generating one or more axis graphic objects equal to the number of axis graphic objects; and
binding the one or more axis graphic objects to the new data set.

5. The method of claim 4, wherein the properties of the chart include a font and font size, wherein the properties of the chart determine a number of tick marks represented by the one or more axis graphic objects.

6. The method of claim 1, wherein the scale includes a minimum and a maximum value of the scale.

7. The method of claim 1, further comprising:
receiving a selection of the at least one axis graphic object; and
changing an appearance of the at least one axis graphic object based on a user input.

8. The method of claim 1, wherein the at least one axis graphic object includes a same types of graphic objects as the chart.

9. A non-transitory computer-readable medium storing executable instructions, which when executed by a processing device, cause the processing device to perform operations comprising:
receiving a data set;
generating a chart including a plurality of graphic objects based on the data set and a visual property of the plurality of graphic objects;
determining a scale associated with the chart based on the data set and the plurality of graphic objects;
generating, by an axis manager, an axis dataset, the axis dataset defining properties of at least one axis for the chart based on the scale associated with the chart and the plurality of graphic objects;
generating, by an object manager, at least one axis graphic object based on the axis dataset; and
adding the at least one axis graphic object to the plurality of graphic objects of the chart.

10. The non-transitory computer-readable medium of claim 9, wherein the operations further include:
resizing the chart based on a user input; and
updating the at least one axis graphic object based on the resized chart.

11. The non-transitory computer-readable medium of claim 10, wherein the operation of updating the at least one axis graphic object based on the resized chart, further comprises:
updating the scale based on the user input; and
resizing the at least one axis graphic object based on the updated scale.

12. The non-transitory computer-readable medium of claim 9, wherein the operation of generating at least one axis graphic object based on the scale, further comprises:
generating a new data set based on the scale;
determining a number of axis graphic objects based on properties of the scale and properties of the chart;
generating one or more axis graphic objects equal to the number of axis graphic objects; and
binding the one or more axis graphic objects to the new data set.

13. The non-transitory computer-readable medium of claim 12, wherein the properties of the chart include a font and font size, wherein the properties of the chart determine a number of tick marks represented by the one or more axis graphic objects.

14. The non-transitory computer-readable medium of claim 9, wherein the scale includes a minimum and a maximum value of the scale.

15. The non-transitory computer-readable medium of claim 9, wherein the operations further include:
receiving a selection of the at least one axis graphic object; and
changing an appearance of the at least one axis graphic object based on a user input.

16. The non-transitory computer-readable medium of claim 9, wherein the at least one axis graphic object includes same types of graphic objects as the chart.

17. A system comprising:
a memory component; and
a processing device coupled to the memory component, the processing device to perform operations comprising:
receiving a request to add a graphic object to a digital canvas;
receiving a data set;
generating a data visualization using the data set and a visual property of the graphic object, wherein the data visualization includes the graphic object and one or more additional graphic objects;
generating, by an axis manager, an axis dataset, including at least one axis for the data visualization, wherein the least one axis is based on a scale of the data visualization;
generating, by an object manager, at least one axis graphic object based on the axis dataset; and
binding at least one axis graphic object to the data visualization.

18. The system of claim 17, wherein the operations further include:
determining the axis dataset based on the data visualization.

19. The system of claim 18, wherein the operation of determining the axis dataset based on the data visualization, further comprises:

determining a scale of the data visualization based on a font associated with the data visualization;

determining a number and a location of one or more tick marks based on the scale; and generating the axis dataset using the scale and the number and the location of the one or more tick marks.

20. The system of claim 17, wherein the at least one axis graphic object is one of a plurality of graphic objects generated based on the axis dataset, and wherein the plurality of graphic objects include tick marks and labels.

* * * * *